(12) United States Patent
Wastlick et al.

(10) Patent No.: US 7,366,854 B2
(45) Date of Patent: Apr. 29, 2008

(54) SYSTEMS AND METHODS FOR SCHEDULING MEMORY REQUESTS UTILIZING MULTI-LEVEL ARBITRATION

(75) Inventors: John M. Wastlick, Allen, TX (US); Michael K. Dugan, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 630 days.

(21) Appl. No.: 10/434,044

(22) Filed: May 8, 2003

(65) Prior Publication Data

US 2004/0225847 A1 Nov. 11, 2004

(51) Int. Cl.
G06F 12/00 (2006.01)
G06F 13/00 (2006.01)
G06F 13/28 (2006.01)
(52) U.S. Cl. ...................................... 711/160; 711/105
(58) Field of Classification Search ................ 711/160, 711/105
See application file for complete search history.

(56) References Cited

U.S. PATENT DOCUMENTS

| | | | | |
|---|---|---|---|---|
| 5,535,395 A | * | 7/1996 | Tipley et al. | 710/241 |
| 5,805,854 A | * | 9/1998 | Shigeeda | 711/1 |
| 6,507,886 B1 | | 1/2003 | Chen et al. | |
| 6,629,220 B1 | * | 9/2003 | Dyer | 711/158 |
| 2001/0010066 A1 | * | 7/2001 | Chin et al. | 711/108 |

OTHER PUBLICATIONS

Affidavit of Richard W. Adkisson, Feb. 17, 2005, 4 pages.

* cited by examiner

*Primary Examiner*—Alford Kindred
*Assistant Examiner*—Jesse Moll

(57) ABSTRACT

In an embodiment, a memory scheduler is provided to process memory requests. The memory scheduler may comprise: a plurality of arbitrators that each select memory requests according to age of the memory requests and whether resources are available for the memory requests; and a second-level arbitrator that selects, for an arbitration round, a series of memory requests made available by the plurality of arbitrators, wherein the second-level arbitrator begins the arbitration round by selecting a memory request from a least recently used (LRU) arbitrator of the plurality of arbitrators.

20 Claims, 2 Drawing Sheets

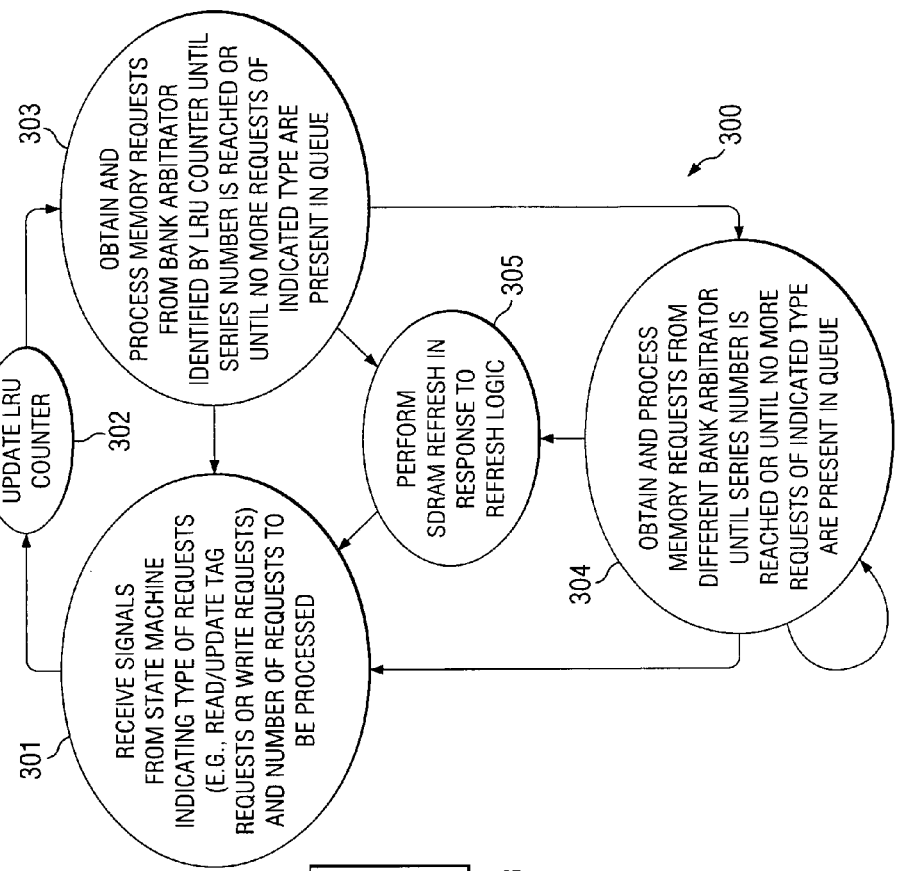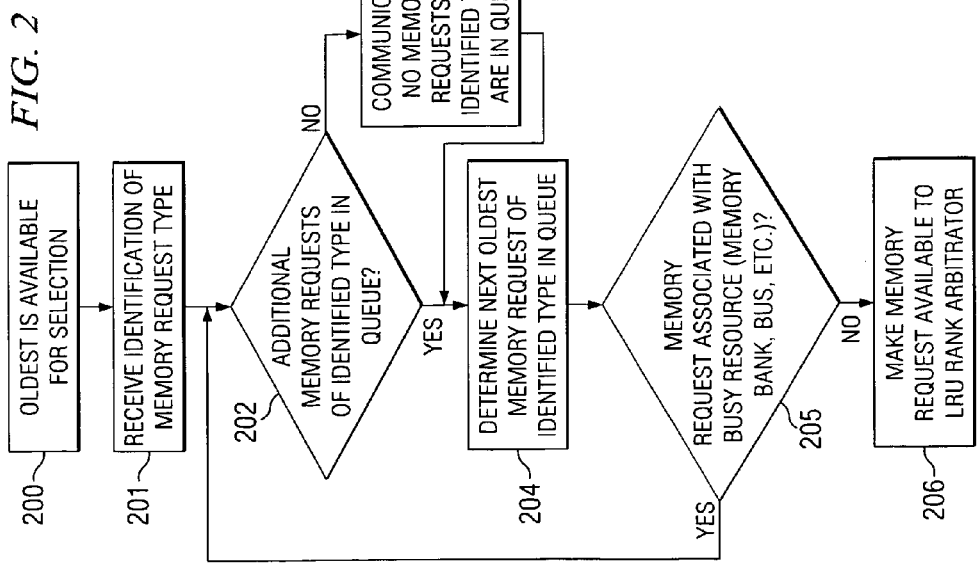

SYSTEMS AND METHODS FOR SCHEDULING MEMORY REQUESTS UTILIZING MULTI-LEVEL ARBITRATION

FIELD OF THE INVENTION

The present invention is related to arbitrating access to a memory system.

DESCRIPTION OF RELATED ART

Main memory in a computer system is typically implemented by coupling a plurality of dynamic random access memories (DRAMs) to a memory bus. Data is stored in and retrieved from the plurality of DRAMs by a controller. The controller may manage memory requests from one or several processors through a suitable interconnect. The controller may determine the order in which the requests are processed. The processing order may depend on a number of factors. For example, the processing may depend upon the physical limitations associated with the plurality of DRAMs.

One of the more common techniques is to employ "a read bypass" scheme. For example, U.S. Pat. No. 6,507,886 (the '886 patent) employs a read bypass scheme in which read requests and write requests are queued for processing by a memory controller. When a read request is received after a write request, the read request may be processed first (unless the read and write request affect the same memory location) thereby bypassing the write requests. Read bypass schemes are advantageous, because processing a plurality of read memory request in series minimizes dead cycles associated with switching between different types of memory requests. Read bypass schemes ensure that pathological states are not reached in which a write request is continuously bypassed by read requests. The memory scheduler of the '886 patent utilizes a counter structure to count the number of pending write requests. When the number of pending write requests exceed a predetermined number, the memory scheduler reverts to a first-in-first-out (FIFO) processing scheme to ensure that the write transactions are processed.

However, known memory schedulers that employ read-bypass schemes neglect the "fairness" of the algorithms. Specifically, known memory schedulers may disproportionately associate memory request latencies with different processors and/or processes.

BRIEF SUMMARY OF THE INVENTION

In an embodiment, a memory scheduler is provided to process memory requests. The memory scheduler may comprise: a plurality of arbitrators that each select memory requests according to age of the memory requests and whether resources are available for the memory requests; and a second-level arbitrator that selects, for an arbitration round, a series of memory requests made available by the plurality of arbitrators, wherein the second-level arbitrator begins the arbitration round by selecting a memory request from a least recently used (LRU) arbitrator of the plurality of arbitrators.

BRIEF DESCRIPTION OF THE DRAWINGS

FIG. 2 depicts a flowchart that describes operations performed by a bank arbitrator according to representative embodiments.

FIG. 3 depicts a state machine that describes operations performed by a least recently used rank arbitrator according to representative embodiments.

DETAILED DESCRIPTION

Figure 1:
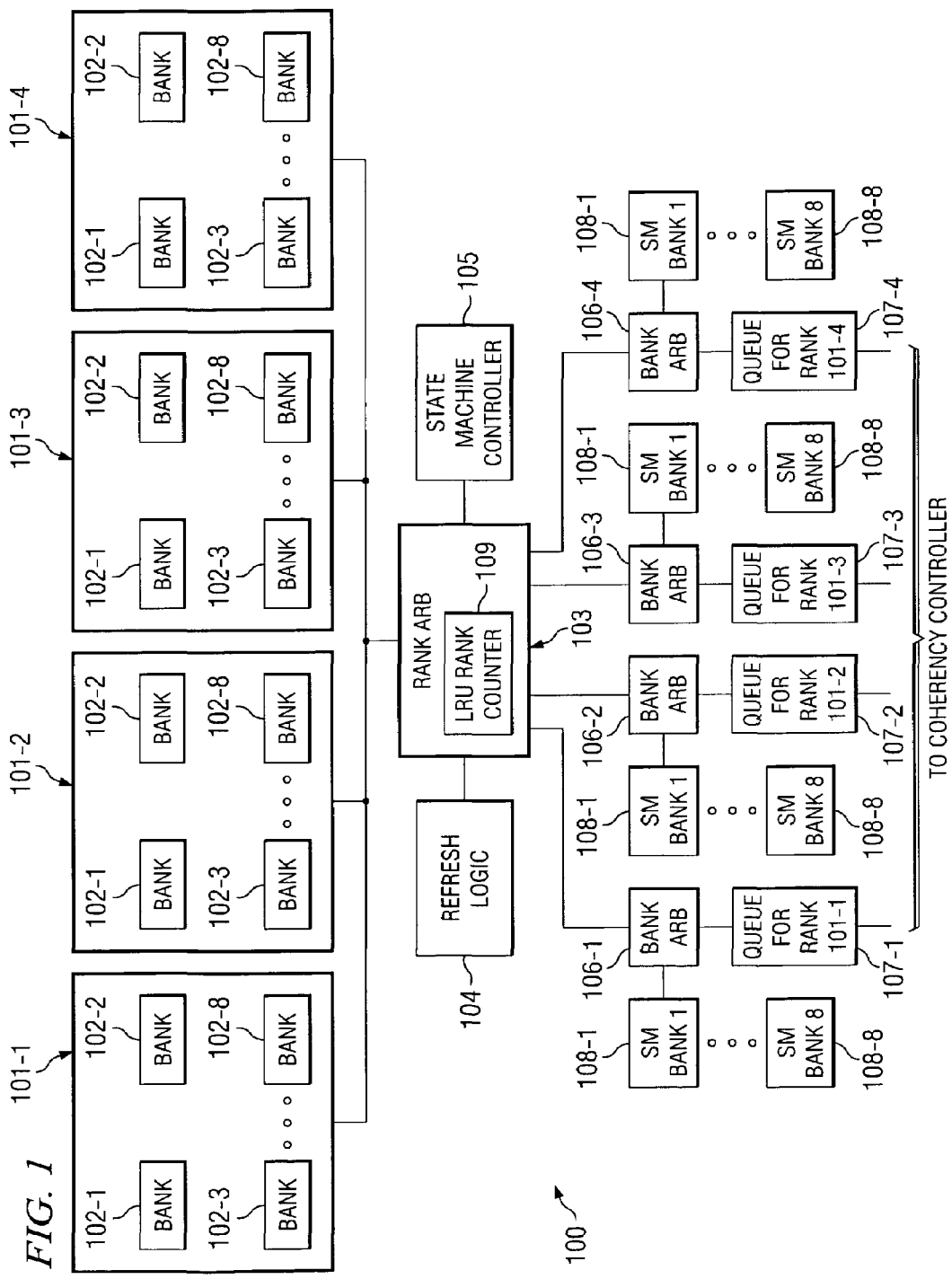
FIG. 1 depicts a memory system that implements memory request scheduling according to representative embodiments.

Representative embodiments may provide a memory scheduler that employs a multi-level arbitration scheme. Specifically, representative embodiments may store and retrieve data from a plurality of ranks of memory components. Memory requests may be separated into a plurality of queues corresponding to the plurality of memory ranks. Each memory request within each queue may be associated with a memory bank of the respective memory rank. Also, memory requests within the queues may be advantageously ordered by age. A first level of arbitration may select a memory request that is the oldest outstanding request of a particular type (e.g., a read/update tag request versus a write request) and that does not present a resource conflict. The first level of arbitration may be performed concurrently by a plurality of arbitrators corresponding to each queue. A second level of arbitration may select memory requests from among the plurality of arbitrators. Specifically, a second-level arbitrator may select a series of memory requests from one of the plurality of arbitrators according to an LRU algorithm. A state machine may be employed to control the second-level arbitrator. The state machine may determine which type of transaction is to be processed, the number of requests in a series to be processed, and/or the like.

Referring now to the drawings, FIG. 1 depicts memory system 100 that implements memory request scheduling according to representative embodiments. Memory system 100 includes a plurality of memory ranks (shown as 101-1 through 101-4) to accept, for example, two double-sided synchronous dynamic random access memory (SDRAM) dual in-line memory modules (DIMMs). Accordingly, a respective plurality of memory banks (shown as 102-1 through 102-8) are accessible through each memory rank 101-1 through 101-4.

Memory system 100 may process memory requests from, for example, a coherency controller (not shown). To process memory requests from a coherency controller, suitable directory tag information may be stored in association with cache lines. Certain memory requests (tag update memory requests) may affect the directory tag information without affecting the cache line data. In representative embodiments, tag update memory requests are treated by the arbitration scheme in the same manner as read memory requests.

Each memory requests identifies an address of the data to be processed. The memory rank, the memory bank, the memory row, and the memory column of the data to be processed may be determined from the identified address. The memory requests may be placed into respective queues (shown as 107-1 through 107-4) depending upon the memory rank 101 in which the data is stored. Queues 107-1 through 107-4 may provide a suitable signal to prevent the coherency controller from overrunning the queues.

Queues 107-1 through 107-4 may advantageously manage memory requests according to the age of the memory requests. Specifically, the position of a memory request within the queue determines the age of the memory request relative to the other memory requests. Furthermore, queues 107-1 through 107-4 differ from ordinary FIFO queues in that bank arbitrators 106-1 through 106-4 may remove a memory request from any position from within the queues. When a respective arbitrator 106 removes a memory request from the middle of its queue 107, all memory requests that are "younger" than the removed memory request will shift down in the queue 106 to maintain the aging mechanism.

Bank arbitrators 106-1 through 106-4 implement the first level of arbitration. Specifically, rank arbitrator 103 may communicate a signal to arbitrate memory requests of a particular type. Also, bank arbitrators 106-1 through 106-4 may receive signals from other logical elements to identify what resources are available. For example, each of bank arbitrators 106 may be communicatively coupled to respective state machines elements 108-1 through 108-8 that indicate the current state of a memory bank 102 within the respective memory rank 101. State machines 108-1 through 108-8 may indicate whether the respective banks may be utilized to store or retrieve data. Other logical elements may be provided. For example, a state element may indicate whether a respective bus is busy depending upon the implementation of the interconnect associated with rank arbitrator 103 and ranks 101-1 through 101-4. By receiving these signals, bank arbitrators 106-1 through 106-4 select the oldest transaction of the identified type associated with a resource that is currently available. Bank arbitrators 106-1 through 106-4 make their respective matching memory requests available to rank arbitrator 103 for the next stage of arbitration.

Rank arbitrator 103 may perform a second level of arbitration. Specifically, rank arbitrator 103 may successively retrieve an identified number (which, for example, could dynamically range from one to eight) of memory requests from bank arbitrators 106. Rank arbitrator 103 may identify the least recently used bank arbitrator 106 utilizing LRU logic 109. To begin the arbitration round, rank arbitrator 103 obtains the oldest memory request made available by the LRU bank arbitrator 106. After the processing the first memory request, rank arbitrator 103 attempts to obtain an identified number of memory requests of a particular type from the LRU bank arbitrator 106. Rank arbitrator 103 will process the memory requests obtained from the LRU bank arbitrator 106. If the processed memory requests obtained from the identified bank arbitrator 106 are less than the identified number for the arbitration round, rank arbitrator 103 may obtain memory requests of the particular type from other bank arbitrators 106 to complete the arbitration round. By beginning an arbitration round according to an LRU algorithm, representative embodiments ensure that memory requests associated with each rank will be serviced with a controlled amount of latency.

After the initial memory request, the type of memory requests to be processed may be controlled by state machine controller 105 which is communicatively coupled to rank arbitrator 103. State machine controller 105 may successively vary the type of memory requests to be processed between read requests/update tag requests and write requests. State machine controller 105 may also vary the number of memory requests to be processed in each arbitration round.

FIG. 2 depicts a flowchart to describe the functionality of bank arbitrator 106 according to representative embodiments. In step 200, the oldest memory transaction within queue 107 is made available for selection by rank arbitrator 103. In step 201 (assuming that the oldest memory transaction was selected by rank arbitrator 103 according to the LRU scheme), an identification of a type of memory request may be received from rank arbitrator 103. In step 202, it is determined whether there is an additional memory request of the identified type in queue 107. If an additional memory request is not in queue 107, the process flow proceeds to step 203 where bank arbitrator 106 communicates a suitable signal to indicate that no memory requests of the identified type are in queue 107. If there is an additional memory request in queue 107, the process flow proceeds to step 204. In step 204, bank arbitrator 106 may determine the next oldest memory request of identified type in queue 107. In step 205, it may be determined whether the memory request is associated with a busy resource (e.g., a memory bank, bus, etc.). If the memory request is not associated with a busy resource, the process flow proceeds to step 206 where the memory request is made available to rank arbitrator 103. If the memory request is associated with a busy resource, the process flow proceeds from step 205 to step 202. Although the process flow of FIG. 2 has been described in terms of successive linear steps for the convenience of the reader, representative embodiments may advantageously perform various steps simultaneously utilizing a suitable logic implementation.

FIG. 3 depicts state machine 300 that may define operations of a second level of memory request arbitration performed by rank arbitrator 103 according to representative embodiments. In state 301, rank arbitrator 103 may receive a signal or signals from state machine controller 105 to identify the type of requests to be processed (e.g., read/update tag requests or write requests) and the number of requests to be processed for a series of memory requests for a given round of arbitration. From state 301, state machine 300 may proceed to state 302 where LRU logic 109 is updated. From state 302, state machine 300 transitions to state 303. In state 303, rank arbitrator 103 obtains and processes memory requests of the identified type from bank arbitrator 106 identified by LRU logic 109 until the series number is reached or until no more memory requests of the identified type are present in the respective queue 107. If the series number is not reached in state 303, state machine 300 transitions to state 304 where memory requests are obtained from a different bank arbitrator or arbitrators 106 until the series number is reached.

When the series number is reached (either from state 303 or state 304), state machine 300 may proceed to either state 301 or 305. Specifically, SDRAM requires the capacitors that implement the memory cells to be refreshed at least once every µsec. Refresh logic 104 may provide a timing mechanism to satisfy the refresh timing requirement. When a refresh is necessary, refresh logic 104 may communicate an appropriate signal to rank arbitrator 103 which, in response thereto, proceeds to state 305 to perform refresh operations. State machine 300 proceeds from state 305 to state 301 or, when the refresh signal is not communicated, from either state 303 or state 304 to state 301 to initiate another arbitration round.

Representative embodiments may provide a number of advantages. Representative embodiments may optimize the processing of memory requests by reordering transactions associated with busy resources. By enabling rank arbitrator 103 to process a series of memory requests of a particular type, read-bypassing may occur. That is, multiple reads may occur in succession thereby reducing dead cycles Also, by varying between different types of memory requests and by utilizing an LRU algorithm, it may be ensured that the latency of memory requests are not unduly affected. Thus, representative embodiments enable memory request performance to be enhanced while maintaining fairness between requesting resources.

What is claimed is:

1. A memory scheduler comprising:
a plurality of arbitrators that each select memory requests according to age of the memory requests and whether resources are available for said memory requests; and
a second-level arbitrator that selects, for an arbitration round, a series of memory requests made available by said plurality of arbitrators, wherein said second-level arbitrator begins said arbitration round by selecting a memory request from a least recently used (LRU) arbitrator of said plurality of arbitrators.

2. The memory scheduler of claim 1 wherein when said second-level arbitrator begins selection of memory requests, said second-level arbitrator processes up to an identified number of memory requests from said LRU arbitrator.

3. The memory scheduler of claim 1 wherein when said second-level arbitrator does not obtain said identified number of memory requests from said LRU arbitrator during said arbitration round, said second-level arbitrator obtains memory requests from at least one other of said plurality of arbitrators to complete said identified number of memory requests.

4. The memory scheduler of claim 1, further comprising:
a plurality of memory ranks; and
a plurality of queues that each queue memory requests associated with a respective memory rank of said plurality of memory ranks, wherein each of said plurality of arbitrators selects memory requests from a respective queue of said plurality of queues.

5. The memory scheduler of claim 4 wherein said memory requests are arranged in said plurality of queues according to age of the memory requests.

6. The memory scheduler of claim 4 wherein a plurality of memory banks are accessible through each of said plurality of memory ranks.

7. The memory scheduler of claim 6 wherein said plurality of arbitrators determine whether respective memory banks are currently busy when selecting memory requests.

8. A method for providing memory scheduling, comprising:
performing a first-level of arbitration, for each of a plurality of queues of memory requests, according to age of the memory requests and whether resources are available for said memory requests; and
performing a second-level of arbitration of memory requests selected in said first-level of arbitration, for an arbitration round, to select a series of memory requests that begins with memory requests obtained from a least recently used (LRU) queue of said plurality of queues.

9. The method of claim 8 further comprising:
processing said series of memory requests.

10. The method of claim 8 wherein said performing said second-level of arbitration obtains up to an identified number of memory requests from said LRU queue.

11. The method of claim 10 wherein when said performing said second-level of arbitration does not obtain said identified number of memory requests from said LRU queue during said arbitration round, said performing said second-level of arbitration obtains memory requests from at least one other of said plurality of queues to complete said identified number of memory requests.

12. The method of claim 8 wherein each of said plurality of queues stores memory requests associated with a respective memory rank of a plurality of memory ranks.

13. The method of claim 12 wherein a plurality of memory banks are accessible through each of said plurality of memory ranks.

14. The method of claim 13 wherein said performing said first-level of arbitration determines whether respective memory banks are currently busy when selecting memory requests.

15. The method of claim 8 wherein said memory requests are arranged in said plurality of queues according to age of the memory requests.

16. A memory scheduler, comprising;
a plurality of means for arbitrating according to age of the memory requests and whether resources are available for said memory requests; and
second-level means for arbitrating for selecting, for an arbitration round, a series of memory requests made available by said plurality of means for arbitrating, wherein said second-level means for arbitrating begins said arbitration round by selecting a memory request from a least recently used (LRU) means for arbitrating of said plurality of means for arbitrating.

17. The memory scheduler of claim 16 wherein when said second-level means for arbitrating begins selection of memory requests, said second-level means for arbitrating processes up to an identified number of memory requests from said LRU means for arbitrating.

18. The memory scheduler of claim 17 wherein when said second-level means for arbitrating does not obtain said identified number of memory requests from said LRU means for arbitrating during said arbitration round, said second-level means for arbitrating obtains memory requests from at least one other of said plurality of means for arbitrating to complete said identified number of memory requests.

19. The memory scheduler of claim 16 wherein said memory requests are arranged in a plurality of queues according to age of the memory requests, and wherein said plurality of means for arbitrating selects memory requests from a respective queue of said plurality of queues.

20. The memory scheduler of claim 16 wherein said plurality of means for arbitrating determine whether respective memory banks are currently busy when selecting memory requests.

* * * * *

UNITED STATES PATENT AND TRADEMARK OFFICE
CERTIFICATE OF CORRECTION

| | |
|---|---|
| PATENT NO. | : 7,366,854 B2 |
| APPLICATION NO. | : 10/434044 |
| DATED | : April 29, 2008 |
| INVENTOR(S) | : John M. Wastlick et al. |

Page 1 of 1

It is certified that error appears in the above-identified patent and that said Letters Patent is hereby corrected as shown below:

In column 5, line 2, in Claim 1, after "scheduler" insert -- , --.

In column 6, line 21, in Claim 16, delete "comprising;" and insert -- comprising: --, therefor.

Signed and Sealed this

Twelfth Day of August, 2008

JON W. DUDAS
*Director of the United States Patent and Trademark Office*